United States Patent [19]

Drnevich

[11] 3,924,451
[45] Dec. 9, 1975

[54] RESONANT COLUMN TESTING APPARATUS

[76] Inventor: Vincent P. Drnevich, 168 Eastover Drive, Lexington, Ky. 40502

[22] Filed: Aug. 21, 1974

[21] Appl. No.: 499,317

[52] U.S. Cl. ................................. 73/67.2; 73/93
[51] Int. Cl.² ........................................ G01M 7/00
[58] Field of Search ............ 73/67.2, 93, 94, 32 A, 73/84

[56] References Cited
UNITED STATES PATENTS
3,362,216   1/1968   Hardin et al. ............................ 73/94
3,699,808   10/1972  Ford et al. ......................... 73/67.2 X OTHER PUBLICATIONS
E. H. F. Date et al., Measurement of the Elasticity and Ultra sound Velocities of Steel, Ultrasonics, Oct. 1971, pp. 209–214.

Primary Examiner—Richard C. Queisser
Assistant Examiner—John P. Beauchamp
Attorney, Agent, or Firm—William E. Sherwood

[57] ABSTRACT

Apparatus for testing the behavior of a column of soil confined between a pair of platens within a pressurized chamber includes a means for selectively applying a resonant torsional vibration, a resonant longitudinal vibration, or both, to the soil column and measuring the behavior of the column during application of the vibrations.

9 Claims, 10 Drawing Figures

RESONANT COLUMN TESTING APPARATUS

BACKGROUND OF THE INVENTION

In various civil engineering and building projects wherein ground motions associated with vibratory phenomena (as for example, traffic loadings, support of vibratory machinery, earthquakes, shocks, or the like) must first be calculated, it becomes necessary to make accurate and time consuming tests of soil samples or specimens. Unlike many structural materials the core samples of soils (which may be cohesive or cohesionless) do not have a readily measurable elasticity and yet the behavior of the specimens needs to be tested according to the concepts of elasticity. Moreover, it frequently is necessary to obtain information as to the energy dissipative characteristics (damping) of the soil sample. By application of the concepts of mechanics of materials, if two essential constants, namely the modulus of rigidity (shear modulus) and the rod modulus (Young's modulus) are known, then the behavior of the soil in situ, represented by the sample, can be determined in advance of stresses actually encountered in the engineering project.

Various types of testing equipment for measuring shear modulus under resonant conditions and for measuring compaction of the soil specimen are available, for example the apparatus disclosed in Hardin et al U.S. Pat. No. 3,362,216 equipped with a dial gage measuring longitudinal length change, but do not provide information as to behavior of the sample under resonant conditions when vibratory stresses are applied longitudinally to the sample. It, therefore, is a purpose of the present invention to provide a single apparatus by means of which a greater number of useful tests may be made upon soil specimens.

SUMMARY

The resonant column testing apparatus of the present invention employs a chamber having a lower and an upper platen confining a column of soil therebetween and with means to supply water and compressed air into the chamber for subjecting the sample column to conditions representative of in-situ soil. A magnet plate supporting torsional and longitudinal accelerometers, in cooperation with fixed coils connected in an electrical circuit, provides for torsional vibration of the column. A centrally disposed coil on the magnet plate in cooperation with a vertically adjustable magnet provides for longitudinal vibration of the column and a tranducer cooperating with the upper platen serves to give constant readings of the length changes of the column resulting from compaction of that column.

Among the objects of the invention are the provision of a testing apparatus for conducting tests on colamnar specimens of a material while selectively applying a resonant torsional vibration, a resonant longitudinal vibration, or both to the specimen simultaneously; the provision of a testing apparatus for measuring the energy dissipative characteristics of a soil specimen upon application of resonant torsional vibration, resonant longitudinal vibration, or both simultaneously to the specimen; the provision of an improved testing apparatus for subjecting a columnar specimen of soil to moisture and pressure conditions representative of in-situ soil and for measuring pore water pressure of the specimen while subjected to resonant vibrations; the provision of a testing apparatus with which changes in length of the specimen column may be measured upon application of pressure and before beginning of vibration; the provision of an improved testing apparatus which can be readily assembled and disassembled and with which columnar soil specimens of different lengths may be employed; the provision of a soil testing apparatus having a magnet plate adapted for both rotational and axial movements; the provision of a testing apparatus with which variation of vibration amplitude may be applied upon the specimen; and the provision of a soil testing apparatus having an improved electrical circuit associated with motion-producing coils and with motion-measuring devices.

These and other objects and advantages of the invention will become more apparent as the description proceeds and when considered in conjunction with the accompanying drawings in which FIG. 1 is a perspective view of the assembled apparatus indicating relative positions of the component parts within the chamber.

Figure 1:
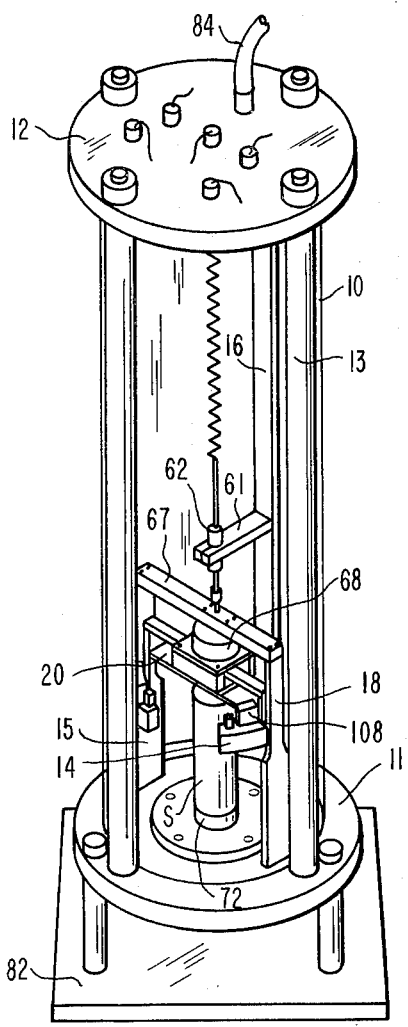
Figure 2:
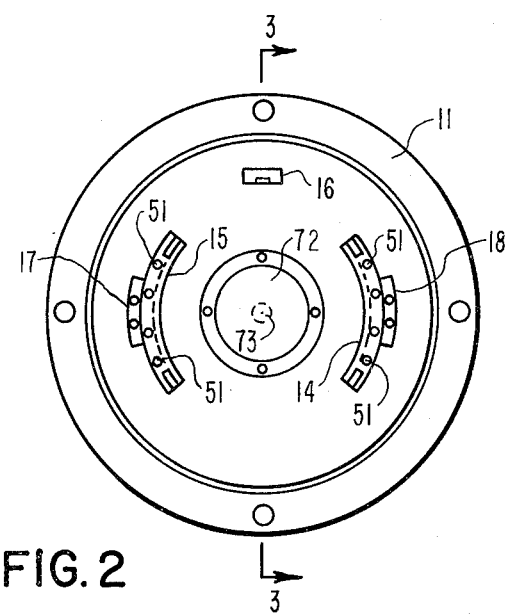
FIG. 2 is a plan view of the lower plate with the standards attached.
Figure 3:
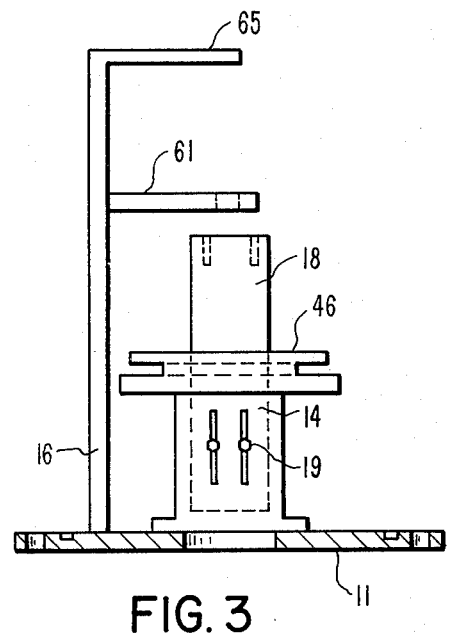
FIG. 3 is a sectional view taken on line 3—3 of FIG. 2 and showing the relative location of the length measuring transducer standard.
Figure 4:
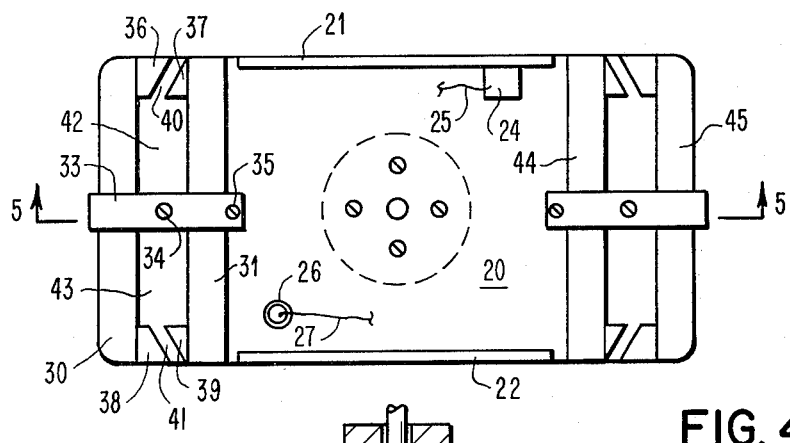
FIG. 4 is a plan view of the magnet plate with the cover and coils removed.

Referring now to FIG. 1 the columnar sample of material to be tested is confined within a pressurized chamber comprising a cylindrical wall 10 which may be formed of Lucite, and which is detachably sealed to a lower plate 11 and to an upper plate 12 by means of connecting rods 13 exterior of that wall. Rigidly affixed to the lower plate is a pair of torsional coil supporting standards 14, 15, best seen in FIGS. 2 and 3, and a longer standard 16 for supporting the length measuring transducer. Vertically adjustable sleeves 17, 18 serving a purpose later to be described are fitted to the torsional coil supporting standards and may be fixed thereto by any suitable means such as bolts 19.

As a significant feature of the invention, a magnet plate 20, which may be of aluminum, has a flat upper surface between side walls 21, 22 on which a cover 23 is supported. Rigidly mounted on the plate between the walls are a torsional accelerometer 24 having a plug-in lead 25 extending therefrom and a longitudinal accelerometer 26 having a plug-in lead 27 extending therefrom. These accelerometers, for example, may be the Columbia Research Laboratory Model 200-1-H hermetically sealed type. Confined to the plate at one end thereof are a pair of permanent magnets 30, 31 spaced centrally from each other by a spacer 32 and held in place by an overhanging bracket 33 which in turn is held in assembled position by bolts 34, 35.

Pole tips 36, 37 and 38, 39 on these magnets are respectively spaced to provide gaps 40, 41 into which the arcuate sides of the torsional coils now to be described may be inserted and interiorly of these gaps open spaces 42, 43 are provided to accomodate the movements of the magnet plates. In like manner a similar pair of magnets 44, 45 are arranged at the other end of the plate.

Figures 6, 7:
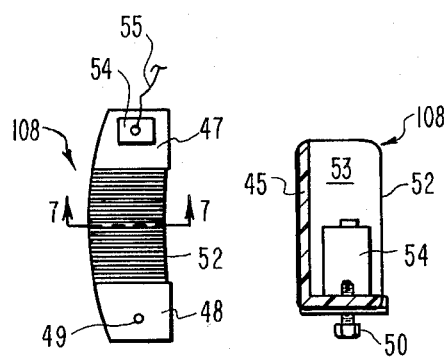
FIG. 6 is a plan view of one of the torsional coils.
FIG. 7 is a sectional view of the coil taken on line 7—7 of FIG. 6.

For cooperation with the described magnet plate four coils such as coil 108 seen in FIGS. 6 and 7 are provided with each coil being wound upon and L-shaped plastic template 45 recessed at the bottom to provide space for the coil wire and to permit the bottom ends of the template to lie flush against the top surface 46 (FIG. 3) of the standards 14 or 15. The bottom ends 47, 48 of the coil project outwardly from the coil and are provided with clamping bolts 49, 50 which are engaged upon the stationary torsional coil standards. The standards are recessed for ease in slipping the ends 47 of the coils into place and the bolts 49 of the coils are adapted to engage slots 51 provided in those standards. Each coil has an arcuate inner vertical side 52 enabling it to slip into the magnet gaps and significantly the vertical dimension of the space 53 within the fixed coil is made sufficiently large to accomodate the vertical movement of the magnet plate while the horizontal dimension of the coil is such as to provide for a rotational movement therein of the magnet plate of about 7½ degrees as torsional vibration is being applied to the specimen. Upstanding from the end 47 of the coil is a wire-connecting fixture 54 to which a plug-in wire 55 may be detachably secured.

Figure 8:
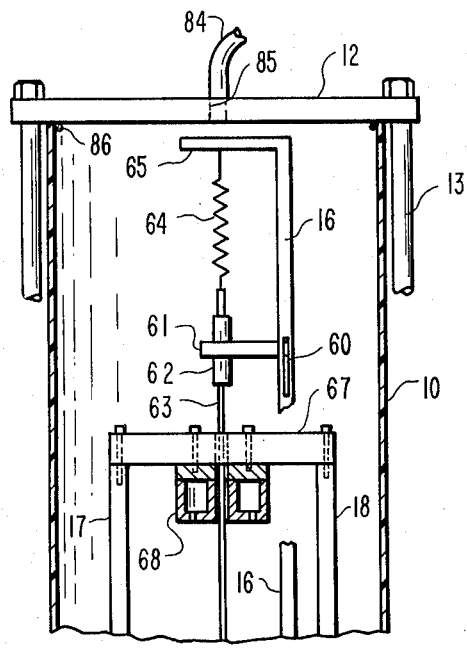
FIG. 8 is a broken away view of the upper portion of the pressure chamber showing the mounting of the length change transducer and the longitudinal magnet.
Figure 5:
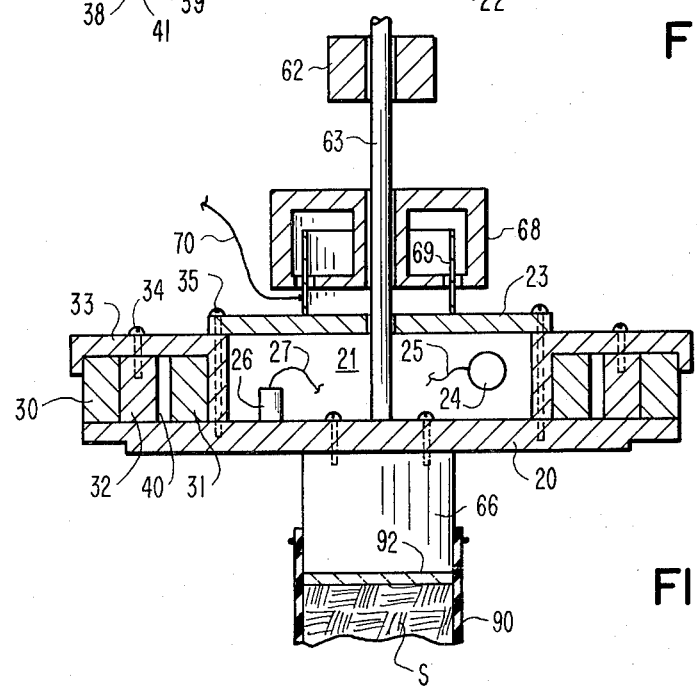
FIG. 5 is a sectional view of the magnet plate taken on line 5—5 of FIG. 4 and indicating the operative location of the plate with respect to the longitudinal magnet and drive coil, the top cap for the specimen, and the length change transducer.

Referring now to FIGS. 5 and 8, the elongated standard 16 which extends from lower plate 11 to near the top plate 12 has a long slot 60 therein providing for selective adjustment of a bracket 61 within which a conventional transducer 62, for example, a Pickering Model 7306 is mounted. An elongated rod 63 passing through the coil of this transducer is supported at its top end by means of a tension spring 64 anchored to an arm 65 extending laterally from standard 16, and is supported at its lower end in rigid contact with the top of the magnet plate 20. The upper platen 66 (FIG. 5) is bolted to the magnet plate 20 and partakes of the plate movement.

Figure 9:
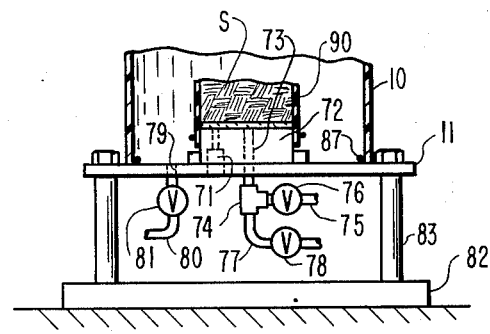
FIG. 9 is an elevation view of the lower platen in position upon the lower plate and showing fluid connections thereto.

Extending across the tops of the adjustable sleeves 17, 18 is a bar 67 bolted to those sleeves and carrying a cylindrical longitudinal magnet 68 surrounding a coil 69 affixed to the upper surface of the magnet plate cover 23 (FIG. 5) and having a lead 70, 71 extending from that coil. Axially disposed below the upper platen is a lower platen 72 (FIG. 9) affixed to the lower plate 11 and provided with a drain passage 73 leading into tee 74. When desired, a pressure transducer 71 may be mounted in the lower platen 72 for the purpose of measuring the pressure in the pore fluid of the specimen. From tee 74 a first pipe 75 controlled by valve 76 may serve to direct water to a burrette (not shown) and a second pipe 77 controlled by valve 78 may be connected to a suitable vacuum source (not shown). An aperture 79 in the lower plate 11 is connected to a pipe 80 controlled by a valve 81 through which water may selectively be furnished to and removed from the interior of the chamber. Moreover, the lower plate is rigidly affixed to and supported above a base 82 by means of spacers 83. In addition, a conduit 84 (FIG. 8) is detachably connected to an aperture 85 is the upper plate 12 and leads to a controlled source of compressed air. Each of the upper and lower plates include seals 86, 87 respectively for sealing the cylindrical wall 10 in place between these plates.

Having thus described certain mechanical features of the apparatus it will be understood that during the conduct of a test the specimen S, which previously has been prepared by encasing the soil in a resilient open-end membrane 90, is mounted with O-ring seals between the lower platen 72 having a porous sintered facing bonded thereto and the upper platen 66 likewise having a similar facing 92. The sleeves 17, 18 as well as the bracket 61 are adjusted to the specimen length so that the magnet 68 makes the proper magnetic linkage with coil 69; the transducer 62 is at the proper height; and the spring 64 biases the weight of rod 63, magnet plate 20 and its attachments with the lower end of that rod fastened on the magnet plate.

With the apparatus thus arranged as indicated in FIG. 1, a typical test would involve filling the chamber through conduit 80 with water to a level above the porous facing 92, but not into contact with the coils on standards 14 and 15. Thereafter compressed air is supplied to the upper end of the chamber through conduit 84 in order to simulate pressure conditions which the specimen would experience in an in-situ environment. As will later appear, measurements may be taken at this time of any changes in length occuring in the specimen. Conventional procedures are employed in intially constructing columnar specimens of either cohesive or cohesionless soils employing split molds (not shown) with vacuum connections and which molds are removed after the specimen is constructed and before confining water or air pressure is applied to the formed specimen. When pore water readings are to be made on the specimen the valve 76 is opened so that the pore water pressure is applied to a measuring device through the communicating conduit 75. As will be evident, the assembly of the torsional drive coils, longitudinal magnet placement and length change transducer takes place following the mounting of the specimen upon the lower platen, and the wiring harness is installed before the initial pressurization of the chamber can take place. of the chamber can take place.

Figure 10:
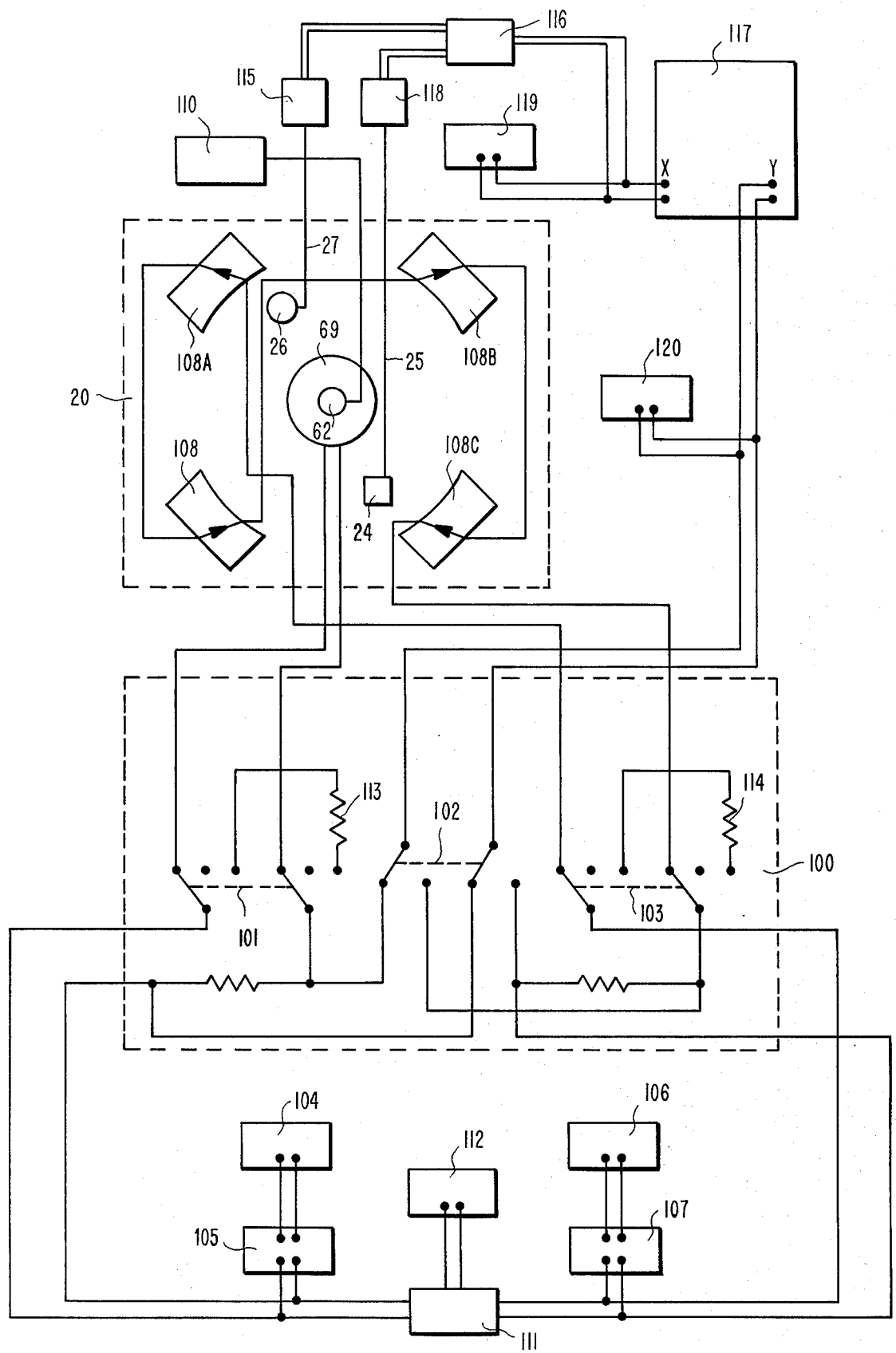
FIG. 10 is a schematic view indicating the electrical and electronic circuit of the apparatus.

Reference now is made to FIG. 10 showing the electrical circuit employed with the described mechanical apparatus, and by means of which the several testing capabilities of the invention are achieved. A control box 100 having triple throw switches 101, 102 and 103 is energized from a sine wave oscillator 104 with a power amplifier 105 when longitudinal motion is being applied to the magnet plate 20. Also connected to the control box is another sine wave oscillator 106 with power amplifier 107 by means of which torsional motion is applied to the magnet plate. This torsional motion is effected by current passing in series through the four coils 108 to 108C in their surrounding relation to the permanent magnets on that plate and the longitudinal motion is effected by current passing through coil 69 in its surrounded relation to the suspended permanent magnet 68. The length change transducer 62 moreover is provided with a separate power supply and readout indicated at 110. In contrast with conventional means (such as dial gages) to measure change of length of a specimen under test, the readout of this tranducer may be in thousandths of an inch and provides for inproved study of the sample. A switch 111 connected between the power amplifiers and to a digital frequency meter 112 permits readings as to the frequency of such vibrations. Contained within the control box circuits are dummy resistors 113, 114 which are equal to the respective resistances of the longitudinal drive coil 69 and of the combined torsional drive coils.

The longitudinal motion measuring accelerometer 26 is connected by a lead 27 to a charge amplifier 115 which in turn is connected through a switch box 116 to terminals on an X-Y oscilloscope 117 used to determine resonance vibrations on the specimen being tested. Likewise, the torsional motion accelerometer 24 is connected by lead 25 to a charge amplifier 118 connected to the switch box 116. An A.C. voltmeter 119 bridging the leads from switch box 116 to the oscilloscope provides readings which are related to the strain amplitude being applied to the specimen. A second A.C. voltmeter 120 bridging the leads extending from the switch box 100 to the other terminals of the oscilloscope serves to measure the force or torque being applied to the specimen. As indicated generally in FIG. 1 connections between the control box 100 and other exterior equipment with the interior of the pressure chamber are made through a plurality of plug-in connectors carried by the upper plate 112.

In employing the described mechanical and electrical elements of the apparatus, resonant frequencies may be determined by setting the appropriate switches, applying power while observing the voltmeter readings and then gradually increasing frequency of vibration until resonance occurs. Resonance may be noted from observation of the oscilloscope figure or by peaking the output from the accelerometer. As will be apparent, by appropriate settings of the described elements resonant frequencies of either torsional vibrations, longitudinal vibrations, or both types of vibrations simultaneously and at different amplitudes, may be applied to the column of soil, and readings taken on the behavior of that soil which then will permit the calculation of the elastic moduli and damping of such soil.

Having thus described a preferred form of apparatus, it will be understood that the invention may be embodied in other forms than that described as being the preferred form and without departing from the scope of the invention as defined by the appended claims.

What is claimed is:

1. Resonant column testing apparatus comprising, a first platen for supporting one end of a column of material to be tested, a second platen resting in contact with the other end of said column, a movable magnet plate attached to said second platen and carrying first magnets, stationary first coils cooperating with said first magnets, a second coil disposed centrally of said plate and attached thereto, a second stationary magnet supported for coaction with said second coil, an electrical circuit including means to energize said coils with a sinusoidally variable and controlled voltage whereby said column may optionally be subjected to resonant torsional vibration by the interaction of said first coils and first magnets and to resonant longitudinal vibration by the interaction of said second coil and said second magnet, and means in said circuit for measuring the behavior of said column during application of either of said vibrations.

2. Apparatus as defined in claim 1 wherein said measuring means includes an accelerometer mounted upon said plate and responsive to torsional vibration and an accelerometer mounted on said plate and responsive to longitudinal vibration.

3. Apparatus as defined in claim 1 wherein said measuring means includes a transducer mounted in operative contact with said second platen and responsive to changes in the length of said column during application of said vibrations.

4. Apparatus as defined in claim 3 including a lower plate supporting said lower platen, an upper plate and a cylindrical wall held between said platen and forming a closed chamber surrounding said column, and rigid standards mounted on said lower plate within said chamber and serving respectively to mount said first coils, said second magnet, and said transducer.

5. Apparatus as defined in claim 4 including means for selectively supplying and removing liquid into said chamber through said lower plate.

6. Apparatus as defined in claim 5 including means for selectively supplying a compressed gas into said chamber through said upper plate.

7. Apparatus as defined in claim 4 wherein said standards supporting said first coils are fixedly attached to said lower plate, said standards supporting said second magnet are adjustably attached to said coil supporting standards and said standard supporting said transducer includes means for adjusting the position of said tranducer whereby columnar specimens of varied lengths may be tested within said chamber.

8. Apparatus as defined in claim 1 wherein said first magnets comprise two pairs of permanent magnets at opposite ends of said magnet plate and with the magnets of each pair spaced from each other to provide gaps, and said first coils comprise four coils having interior spaces into which the outer of the pairs of permanent magnets may be moved upon energization of said electrical circuit.

9. Apparatus as defined in claim 8 wherein the interior spaces of said first coils are sufficiently deep to provide for both rotational and vertical movements of said permanent magnets.

* * * * *